United States Patent
Hajek et al.

(10) Patent No.: US 7,420,016 B2
(45) Date of Patent: Sep. 2, 2008

(54) MOULDING COMPOSITIONS FOR THE PRODUCTION OF SANITARY-WARE COMPONENTS

(75) Inventors: Andreas Hajek, Brackenheim (DE); Thomas Heck, Aglasterhausen (DE); Stefan Harke, Sinsheim-Rohrbach (DE); Thomas Wilhelm, Sulzfeld (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 0 days.

(21) Appl. No.: 11/503,484

(22) Filed: Aug. 11, 2006

(65) Prior Publication Data

US 2007/0037921 A1    Feb. 15, 2007

Related U.S. Application Data

(63) Continuation of application No. 09/664,241, filed on Sep. 18, 2000, now abandoned, which is a continuation of application No. PCT/EP99/01121, filed on Feb. 20, 1999.

(30) Foreign Application Priority Data

Mar. 19, 1998    (DE) ................................ 198 12 122

(51) Int. Cl.
*C08F 290/04* (2006.01)
*C08F 265/06* (2006.01)

(52) U.S. Cl. .................. 525/80; 523/201; 524/504; 524/506; 524/523; 524/529; 525/85; 525/190; 525/242; 525/902

(58) Field of Classification Search ............... 523/201; 524/504, 506, 523, 525, 529; 525/80, 85, 525/190, 242, 902
See application file for complete search history.

(56) References Cited

U.S. PATENT DOCUMENTS

| | | | | |
|---|---|---|---|---|
| 3,661,994 A | * | 5/1972 | Hwa et al. | 525/71 |
| 3,870,557 A | | 3/1975 | Fink et al. | 442/76 |
| 4,180,529 A | * | 12/1979 | Hofmann | 525/85 |
| 5,087,662 A | * | 2/1992 | Alsmarraie et al. | 525/100 |

FOREIGN PATENT DOCUMENTS

| | | | |
|---|---|---|---|
| DE | 21 35 828 | | 2/1973 |
| DE | 24 49 656 | | 12/1975 |
| DE | A 28 15 506 | | 12/1978 |
| DE | 198 12 122.9 | | 3/1998 |
| EP | 0 297 706 | | 1/1989 |
| EP | 0361101 | | 4/1990 |
| EP | 0 639 539 | | 2/1995 |
| EP | 639539 A1 | * | 2/1995 |
| WO | WO 88/05450 | | 7/1988 |
| WO | WO 8805450 A | * | 7/1988 |
| WO | WO 92/03497 | | 3/1992 |
| WO | WO 95/23825 | | 9/1995 |
| WO | WO 99/47576 | | 9/1999 |

OTHER PUBLICATIONS

Trasnslation to EP 639539 A1 (Feb. 1995).*
U.S. Appl. No. 09/664,241, filed Sep. 2000, Hajek et al.

* cited by examiner

*Primary Examiner*—Kelechi C Egwin

(57) ABSTRACT

In order, in the case of a moulding composition for the production of sanitary-ware components, comprising a methyl-methacrylate-based syrup and from 50 to 85%, expressed in terms of the moulding composition, of an inorganic filler, to obtain an improvement in the scratch-proofness and the abrasion resistance of the shaped components which are obtained therefrom, it is proposed that the composition furthermore comprise elastomer particles or elastomer particle aggregates having a particle size <100 μm in an amount in the range of 5% by weight to <20% by weight, expressed in terms of the mass of the syrup.

12 Claims, No Drawings

MOULDING COMPOSITIONS FOR THE PRODUCTION OF SANITARY-WARE COMPONENTS

This application is a continuation of Ser. No. 09/664,241 filed Sep. 18, 2000 now abandoned, which is a continuation of International Application No. PCT/EP99/01121 filed on Feb. 20, 1999, which claims priority of German application No. 198 12 122.9 filed on Mar. 19, 1998.

The invention relates to a moulding composition for the production of sanitary-ware components, which comprises a methyl-methacrylate-based syrup and from 50 to 85%, expressed in terms of the moulding composition, of an inorganic filler. The invention furthermore concerns sanitary-ware components produced from such moulding compositions, the term sanitary-ware components being used in the wide sense and besides washbasins, shower bases, bathtubs, also covering kitchen sinks, work surfaces and the like.

Many moulding compositions of the type described in the introduction are known from the literature, for example from German Patent DE 2449656 and European patent application EP 0361101 or WO 95/23825.

Because of the not very high impact strength of the cured moulding-composition materials, the shaped components need to be designed with a relatively large wall thickness (sometimes in excess of 10 mm). Wall thicknesses of this order lead, especially in the case of formulations in which intentional sinking of coarse filler particles towards the visible side takes place, to very uneven reverse sides and, in the case of kitchen sinks, the drainage holes often exhibit high degrees of roughness or even bubbles. This causes problems in the subsequent processing. In particular, this can give rise to leaks in the outlet fixture, especially if a moulding-composition burr needs to be ground down.

In the case of moulding compositions which are produced using cristobalite powders, i.e. a very fine-grained material, as filler, relatively poor scratch-proofness and abrasion resistance are found, whereas the aforementioned moulding compositions with relatively coarse, sinking fillers have a relatively high degree of surface roughness.

In general, the syrup production necessarily requires the addition of pre-polymeric methacrylate, hereafter abbreviated to PMMA, which demands longer solution times for the PMMA in the methyl methacrylate monomers. This increases the production times, and hence the production costs as well.

The moulding compositions finally obtained, with the necessary viscosities, entail relatively long filling times for the moulds, which may sometimes exceed one minute in the case of moulds which are used for the production of kitchen sinks, even if filling pressures of 5 bar are used.

The object of the present invention is to provide a moulding composition which, especially when cristobalite powders are used as the filler, provides improved scratch-proofness and abrasion resistance for the shaped components obtained therefrom.

This object is achieved according to the invention in that the moulding composition additionally comprises elastomer particles or elastomer particle aggregates having a particle size smaller than 100 μm in an amount in the range of 5% by weight to less than 20% by weight, expressed in terms of the mass of the syrup.

The lower limit of 5% by weight for the addition of elastomer particles or elastomer particle aggregates needs to be complied with in order to obtain a significant effect on the scratch-proofness and abrasion resistance. It is expedient to keep below the 20% by weight limit since higher elastomer-particle contents give rise not to better, but actually to poorer results in terms of scratch-proofness and abrasion resistance.

The preferred range, in which the elastomer particles or elastomer particle aggregates are used in the moulding composition, is in the range of 10 to 18% by weight, expressed in terms of the mass of the syrup.

The term particle size is intended to mean the size of the individual elastomer particles or, when aggregates are present, the size of the particle aggregates.

For the present invention, it is possible to use both particles to which are present in isolation and also particle aggregates, which may remain aggregated when taken up in the syrup. Excessively large aggregates particles may be disaggregated.

The moulding composition according to the invention not only increases the abrasion resistance and scratch-proofness of the shaped component, especially when cristobalite powders are used as the inorganic filler, but also imparts even better impact strength to the shaped component, which enables a significant reduction in the wall thickness, for example of the basins of kitchen sinks.

Another advantageous effect of the moulding compositions according to the invention is that the reverse sides, i.e. the low-quality side of the shaped component, is kept relatively smooth. Furthermore, owing to faster syrup production, the moulding compositions according to the invention can be prepared more quickly overall.

If relatively coarse fillers are used in the moulding composition according to the invention, then smoother surfaces are obtained than when using the previously known formulations.

Surprisingly, the filling times for the mould cavities can furthermore be shortened, even with a reduced pressure in the filling vessel.

PMMA with a molecular weight ($M_W$) in the range of from 50,000 to 250,000 may be added as a viscosity-modifying agent to the moulding composition (i.e. firstly the syrup), in an amount of up to 20% by weight, expressed in terms of the mass of the syrup.

The elastomer of the particles or aggregates preferably consists of partially crosslinked polymer.

The elastomer particles or particle aggregates preferably have particles with a core/shell structure, the core being formed by an elastomer and the shell from a matrix-compatible polymer which is essentially insoluble in the syrup. The core/shell structure provides greater opportunities for variation in terms of the elastomer, since it can be selected without regard to its compatibility with the syrup.

The shell is preferably chemically bonded to the core elastomer.

In this case, or even if there is no chemical bonding with the core elastomer, the shell may be a thermoplastic polymer.

The shell is preferably a partially crosslinked polymer, and also preferably the shell is swellable in the syrup of the moulding composition. In this case, the addition of elastomer particles or elastomer particle aggregates may be used at the same time as a means of modifying the viscosity of the moulding composition, and partly or fully obviates the addition of PMMA. The core elastomer of the particles preferably consists of a partially crosslinked polysiloxane, which is grafted with an acrylate monomer to form the shell.

The structure of the core/shell particles preferably has a core proportion of from 40 to 60% by weight, expressed in terms of the particle weight.

The filler content in terms of inorganic filler in the moulding composition is preferably from 60 to 80% by weight, expressed in terms of the moulding composition.

The moulding composition according to the invention is especially suitable for the production of sanitary-ware components, the term sanitary-ware components being intended to mean not only hand washbasins, toilet bowls, shower bases and bathtubs, but also dishwashing surfaces, kitchen sinks, work surfaces in the kitchen and the like.

Kitchen sinks, which are produced using the moulding composition according to the invention, can be produced with a reduced bottom thickness in the basin of the kitchen sink, equal in particular to less than 7 mm.

The increase in the impact strength with the moulding composition according to the invention may be so great that even bottom thicknesses of $\leq 5$ mm at the bottom of the basin of the kitchen sink become possible.

Such small bottom thicknesses in the case of kitchen sinks, which can of course also be applied analogously to other shaped components, signify not only the use of less polymer material, and hence more economical production, but furthermore also signify shorter cycle times in the production of the shaped components, as well as lower weight overall, which leads to advantages for handling when these shaped components are being processed or installed.

These and further advantages of the invention will be explained in more detail below with reference to the examples.

The general production of the moulding compositions according to the invention is carried out essentially using the procedure known from the prior art, as can be found in particular in the documents, which have already been cited in the introduction, pertaining to conventional moulding compositions. For this reason, the production of the moulding compositions will be dealt with only in brief below. Starting with the methyl methacrylate monomers, the elastomer particles or elastomer particle aggregates to be used are dispersed therein, from which a relatively viscous dispersion results. This dispersion preferably contains about 75 parts by weight of MMA and 25 parts by weight of elastomer particles or elastomer particle aggregates. The dispersion may then furthermore be diluted with MMA or alternatively with MMA/PMMA syrup, to give the desired elastomer concentration or viscosity of the syrup. The required dispersion of the elastomer particles or elastomer particle aggregates, which was described in the introduction, should be carried out with a rapidly rotating dissolver disc, in order to disaggregate excessively large aggregate particles. As mentioned above, the aggregate particles in the dispersion to be used should have a size smaller than 100 µm. The primary particle size of the aggregates is frequently about 100 nm.

As mentioned above, preferred elastomer particles have a core/shell structure, and in the examples which follow, use will be made of an elastomer-particle material which can be obtained from the company Wacker, Burghausen, Germany and is available under the brand reference VP 445006 (hereafter referred to as the Wacker modifier).

The fillers to be used are added to the syrup containing the elastomer particles or elastomer particle aggregates in a manner which is known per se, in the form of powders, sands or grit of a large number of mineral materials known per se as inorganic fillers. Crosslinking agents, radical initiators and mould-release agents furthermore added, and the moulding composition thus obtained is then introduced into the appropriate mould cavities.

The temperature cycles for curing the moulding composition in the mould cavities are no different from the temperature cycles which have been recommended in the prior art. In the subsequent comparative examples and examples, the following temperature cycle was used:

Before and during filling, the visible side of the mould is regulated to 60° C. and its reverse side to 40° C. The moulding composition is generally at room temperature when filling.

In the mould when it has been filled, the temperature of the visible side is increased to 100° C. and kept at this level for 30 min.

After the mould has been filled, its reverse side temperature is kept regulated to 40° C. for a further 10 min, and then kept at 100° C. for the rest of the cycle (about 20 min).

The cured shaped components can be released from the mould at 100° C.

Wherever cristobalite powder is employed in the (comparative) examples below, quartz powder may equally well be used. The mechanical properties reported for cristobalite-filled shaped components are also obtained for those filled with quartz powder.

The properties of the shaped components obtained (kitchen sinks were produced in the examples) were then measured on the shaped components thus obtained.

For comparison with conventionally produced kitchen sinks, the properties of scratch-proofness, abrasion resistance and impact strength were examined.

The scratch-proofness was tested using a so-called "hardness and adhesion tester", model 413 from the company Erichsen, Hemer, Germany, a diamond needle with a 90° cone having been used in order to make scratches on the used side (visible side) of a sample under increasing loads of from 1 to 10 N.

The depth of these scratches was measured as Rmax using a roughness depth meter, model T 2000, with linear feed unit LV 50 from the company Hommelwerke, Villingen-Schwenningen, Germany.

In conclusion, the shaped components produced according to the invention are noteworthy in that they have a substantially improved scratch-proofness. Samples (comparative examples) which have a very high initial roughness, i.e. exhibited a very high degree of surface roughness, were excluded from the scratch-proofness testing, because the scratch depth to be found is generally much less than the roughness to be measured on the surface. In these cases, the surface roughness was merely tested, using the roughness depth meter, and indicated.

The impact strength was measured using the so-called Charpy method, based on DIN 53453. Unlike in the standard, the sample thicknesses result in this case from the thickness of the shaped-component section on which the testing is carried out. All the other conditions in the standard are followed.

The impact loading is in each case applied in such a way that there is an impact perpendicular to the visible side of the shaped component. A model 5102 instrument from the company Zwick in Ulm, Germany is used for the impact experiments.

The abrasion resistance of the visible-side surfaces of the shaped components is tested according to DIN 53754, the Taber Abrader instrument, model 5130 from the company Teledyne Taber, North Tonawanda, N.Y., USA was used as the test instrument.

COMPARATIVE EXAMPLE 1

1.8 kg of a normal type of PMMA in the molecular weight $M_W$ range of from 50,000 to 200,000 was dissolved in 8.2 kg of MMA, and a mould-release agent (27 g of stearic acid from the company Merck, Germany) and a crosslinking agent (200 g of trimethylolpropane trimethacrylate from the company Degussa, Germany) were added. 17 kg of cristobalite powder (all particles <200 µm, silanized, with the particle size distribution 5% >100 μm, 42% by weight >32 μm) were then used to adjust the filler content of the moulding composition to 63% by weight. After the addition of peroxides (35 g of Perkadox 16 and 80 g of Laurox, in each case from the company Akzo, Holland), polymerisation was carried out in suitable mould cavities, so as to form a kitchen sink. The filling time was about 45 s and the filling pressure was 3.5 bar.

The impact strength, the scratch-proofness and the Taber abrasion resistance were determined for a sample taken from the basin bottom of the shaped component, which had a thickness of 9 mm. In addition, the reverse side of the shaped component was visually assessed.

Results:
Impact strength: 4.5 kJ/m$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 14.9 | 14.4 | 12.3 | 8.0 | 6.9 | 5.6 | 3.0 | 2.0 | | |

Abrasion resistance: 43.7 mg/100 revolutions

The reverse side was relatively smooth, and the powdered filler had not sunk.

COMPARATIVE EXAMPLE 2

0.9 kg of a normal type of PMMA in the molecular weight $M_W$ range of from 50,000 to 200,000 was dissolved in 9.1 kg of MMA, and a mould-release agent and a crosslinking agent were added according to Comparative Example 1. The syrup thus obtained was less viscous than in Comparative Example 1. 17 kg of cristobalite powder (all particles <200 μm, silanized, with the particle size distribution 5% >100 μm, 42% by weight >32 μm) were then used to adjust the filler content of the moulding composition to 63% by weight. After the addition of peroxides (as in Comparative Example 1), polymerisation was carried out in suitable mould cavities, so as to form a kitchen sink. The filling time was 13 s and the filling pressure was 2 bar.

The impact strength, the scratch-proofness and the Taber abrasion resistance were determined for a sample taken from the basin bottom of the shaped component, which had a thickness of 8.5 mm. In addition, the reverse side of the shaped component was visually assessed.

Results:
Impact strength: 7.5 kJ/m$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 10.4 | 9.4 | 8.8 | 7.4 | 7.5 | | | | | |

Abrasion resistance: 21.7 mg/100 revolutions

The reverse side was very rough. The powdered filler had sunk and the values for the scratch-proofness and the abrasion resistance were significantly improved.

COMPARATIVE EXAMPLE 3

2.0 kg of a normal type of PMMA in the molecular weight $M_W$ range of from 50,000 to 250,000 were dissolved in 8.0 kg of MMA, and a mould-release agent (35 g of stearic acid from the company Merck, Germany) and a crosslinking agent (200 g of trimethylolpropane trimethacrylate from the company Degussa, Germany) were added. 27 kg of a sand with rounded edges in the 200 to 2000 μm particle size range (a mixture of silanized SIG types 1/8 and 2/9 from the company Dorfner in Amberg, Germany) were then added, which gave a filler proportion in the moulding composition of 73% by weight. This moulding composition used a comparatively viscous syrup like Comparative Example 1, and a much coarser filler than Comparative Examples 1 and 2. After the addition of peroxides (40 g of Perkadox 16 and 80 g of Laurox, in each case from the company Akzo, Holland), the moulding composition was polymerised in suitable moulds in such a way that the used side of the shaped component was turned downwards. The filling time was 70 s and the filling pressure was 5 bar.

The particle distribution of the shaped component was very uniform; at the same time the filler underwent slight (desired) sinking to the used side of the shaped component. The reverse side of the shaped component was very rough in parts, and after grinding, the drainage area of the reverse side had small holes which impaired the leaktightness of an outlet fixture fitted to it. The thickness of the basin bottom was 10 mm.

Results:
Impact strength: 1.8 mJ/mm$^2$,
Surface roughness of the used side of the basin bottom 103.5 μm. The scratch-proofness test was not carried out on this sample, since it could not provide any meaningful data in view of the extremely high degree of surface roughness.

EXAMPLE 1

1.5 kg of silicone elastomer (type VP 445006) having an elastomer particle size (aggregates) of up to about 1 mm, from the company Wacker, Burghausen, Germany, was added to 8.5 kg of MMA and dispersed intensively in a dissolver (type Dispermat AE9) from the company VMA Getzmann, Reichshof, Germany in order to bring the aggregates to particle sizes smaller than 100 μm. A mould-release agent and a crosslinking agent were added to the dispersion thus obtained, as in Comparative Example 1. 17 kg of cristobalite powder (all particles <200 μm, silanized, with the particle size distribution 5% >100 μm, 42% by weight >32 μm) were then used to adjust the filler content of the moulding composition to 63% by weight. After the addition of peroxides (as in Comparative Example 1), polymerisation was carried out in suitable mould cavities, so as to form a kitchen sink. The filling time was about 30 s and it was possible reduce to the filling pressure to 1 bar.

The impact strength, the scratch-proofness and the Taber abrasion resistance were determined for a sample taken from the basin bottom of the shaped component, which had a thickness of 9 mm. In addition, the reverse side of the shaped component was visually assessed.

Results:
The following extraordinarily good impact strength was obtained: 12.8 kJ/m$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 11.1 | 9.9 | 7.3 | 6.0 | 4.9 | 3.7 | | | | |

Abrasion resistance: 35 mg/100 revolutions

The filler had sunk slightly, resulting in an improved scratch-proofness and abrasion resistance, but the reverse side was nevertheless relatively smooth.

EXAMPLE 2

The same formulation as in Example 1 was used, but a shaped component (kitchen sink) having a smaller thickness of 5 mm at the basin bottom was produced, and the mechanical values corresponded to those in Example 1. Because of the very high impact strength, the shaped-component thickness is entirely sufficient to withstand the stresses of daily use (e.g. pan-drop test).

EXAMPLE 3

The results of this example are to be compared with Comparative Example 3.

1.5 kg of silicone elastomer (type VP 445006) from the company Wacker, Burghausen, Germany was added to 8.5 kg of MMA and dispersed intensively (see above). A mould-release agent and a crosslinking agent were then added as in Comparative Example 3. 27 kg of a round sand, or a sand with rounded edges, in the 200 to 2000 μm particle size range (a mixture of silanized SIG types 1/8 and 2/9 from the company Dorfner in Amberg, Germany) were then added, which gave a filler proportion in the moulding composition of 73% by weight. It was possible here to omit the PMMA proportion in the formulation of Comparative Example 3.

After the addition of peroxides (as in Comparative Example 3), the moulding composition was polymerised in suitable moulds in such a way that the used side of the shaped component was turned downwards. The filling time was about 30 s and the filling pressure was 1 bar.

The particle distribution of the filler in the shaped component was very uniform; at the same time the filler underwent slight sinking to the used side of the shaped component. The reverse side of the shaped component was very rough in parts, but after grinding, the drainage area of the reverse side had no holes which could impair the leaktightness of an outlet fixture fitted to it. The thickness of the basin bottom was 10 mm.

Results:
Impact strength: 2.7 kJ/mm$^2$
Surface roughness Rmax of the used side of the basin bottom: 61.6 μm

EXAMPLE 4

0.3 kg of a normal type of PMMA in the molecular weight $M_W$ range of from 50,000 to 200,000 was dissolved in 8.71 kg of MMA, and a mould-release agent and a crosslinking agent were added as in Comparative Example 1. In addition, 1.0 kg of silicone elastomer (VP 445006 from the company Wacker, Burghausen, Germany) was added in finely dispersed form. 17 kg of cristobalite powder (all particles <200 μm, silanized, with the particle size distribution 5% >100 μm, 42% by weight >32 μm) were then used to adjust the filler content of the moulding composition to 63% by weight. After the addition of peroxides (as in Comparative Example 1), polymerisation was carried out in suitable mould cavities, so as to form a kitchen sink. The filling time was 33 s and the vessel pressure was 1.5 bar.

The impact strength, the scratch-proofness and the Taber abrasion resistance were determined for a sample taken from the basin bottom of the shaped component, which had a thickness of 8 mm. In addition, the reverse side of the shaped component was visually assessed.

Results:
Impact strength: 10.4 kJ/m$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 13.2 | 11.5 | 9.9 | 8.8 | 6.5 | 3.7 | | | | |

Abrasion resistance: 27.7 mg/100 revolutions

The reverse side was relatively smooth, and the filler had scarcely sunk.

EXAMPLE 5

0.7 kg of a normal type of PMMA in the molecular weight $M_W$ range of from 50,000 to 200,000 was dissolved in 8.8 kg of MMA, and a mould-release agent and a crosslinking agent were added as in Comparative Example 1. In addition, 0.5 kg of silicone elastomer (VP 445006 from the company Wacker, Burghausen, Germany) was added in finely dispersed form (aggregates <100 μm). 17 kg of cristobalite powder (all particles <200 μm, silanized, with the particle size distribution 5% >100 μm, 42% by weight >32 μm) were then used to adjust the filler content of the moulding composition to 63% by weight. After the addition of peroxides (as in Comparative Example 1), polymerisation was carried out in suitable mould cavities, so as to form a kitchen sink. The filling time was 9 s and the vessel pressure was 3 bar.

The impact strength, the scratch-proofness and the Taber abrasion resistance were determined for a sample taken from the basin bottom of the shaped component, which had a thickness of 8.5 mm. In addition, the reverse side of the shaped component was visually assessed.

Results:
Impact strength: 9.5 kJ/mm$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 10.4 | 10.4 | 9.9 | 7.2 | 5.7 | 3.7 | 2.6 | | | |

Abrasion resistance: 29.6 mg/100 revolutions

The reverse side was relatively smooth, and the filler had scarcely sunk.

COMPARATIVE EXAMPLE 4

2.0 kg of silicone elastomer (type VP 445006) from the company Wacker, Burghausen, Germany were added to 8.0 kg of MMA and dispersed intensively using a dissolver (type Dispermat AE9) from the company VMA Getzmann, Reichshof, Germany (aggregates <100 μm). A mould-release agent and a crosslinking agent were, as in Comparative Example 1, added to the dispersion. 17 kg of cristobalite powder (all particles <200 μm, silanized, with the particle size distribution 5% >100 μm, 42% by weight >32 μm) were then used to adjust the filler content of the moulding composition to 63% by weight. After the addition of peroxides, polymerisation was (as in Comparative Example 1) carried out in suitable mould cavities, so as to form a kitchen sink. The filling time was about 30 s and it was possible to reduce the filling pressure to 1 bar.

The impact strength, the scratch-proofness and the Taber abrasion resistance were determined for a sample taken from the basin bottom of the shaped component, which had a thickness of 8 mm. In addition, the reverse side of the shaped component was visually assessed.

Results:
Impact strength: 6.6 kJ/m$^2$
Scratch-proofness:

| Load: (N) | 10 | 9 | 8 | 7 | 6 | 5 | 4 | 3 | 2 | 1 |
|---|---|---|---|---|---|---|---|---|---|---|
| Depth(μm) | 23.4 | 18.8 | 15.0 | 13.3 | 9.0 | 5.7 | 3.7 | 2.9 | | |

Abrasion resistance: 49.4 mg/100 revolutions

The filler had not sunk, so improved scratch-proofness and abrasion resistance did not result; the reverse side was relatively smooth.

The invention claimed is:

1. Moulding composition for the production of sanitary-ware components, comprising a methyl-methacrylate-based syrup and from 50 to 85% by weight, expressed in terms of the moulding composition, of an inorganic filler, wherein the moulding composition furthermore comprises elastomer particles or elastomer particle aggregates wherein the elastomer particles or elastomer particle aggregates consist of particles or aggregates having a particle size smaller than 100 µm in an amount in the range of 5% by weight to less than 20% by weight, expressed in terms of the mass of the syrup, and wherein no elastomer particles or elastomer particle aggregates having particle sizes equal to or greater than 100 µm are present.

2. Moulding composition according to claim 1, characterized in that the syrup comprises PMMA with a molecular weight ($M_w$) of from 50,000 to 250,000 in an amount of up to 20% by weight, expressed in terms of the mass of the syrup.

3. Moulding composition according to one of claim 1, characterized in that the elastomer of the particles or aggregates consists of partially crosslinked polymer.

4. Moulding composition according to claim 1, characterized in that the elastomer particles have a core/shell structure, the core being formed by an elastomer and the shell from a matrix-compatible polymer which is essentially insoluble in the syrup.

5. Moulding composition according to claim 4, characterized in that the shell is chemically bonded to the core elastomer.

6. Moulding composition according to claim 4, characterized in that the shell comprises a thermoplastic polymer.

7. Moulding composition according to claim 4, characterized in that the shell comprises a partially crosslinked polymer.

8. Moulding composition according to claim 4, characterized in that the shell is swellable in the syrup of the moulding composition.

9. Moulding composition according to claim 4, characterized in that the shell comprises an acrylate polymer.

10. Moulding composition according to claim 4, characterized in that the core consists of a partially cross-linked polysiloxane, which is grafted with an acrylate monomer to form the shell.

11. Moulding composition according to claim 4, characterized in that the proportion by weight of the core in the core/shell elastomer particles amounts to a proportion of from 40 to 60% by weight.

12. Moulding composition according to claim 1, characterized in that the filler content is from 60 to 80% by weight, expressed in terms of the moulding composition.

* * * * *